Sept. 22, 1953     P. S. JERNIGAN     2,652,926
WATER DISCHARGE FITTING FOR FUEL TANKS AND THE LIKE
Filed Sept. 26, 1949
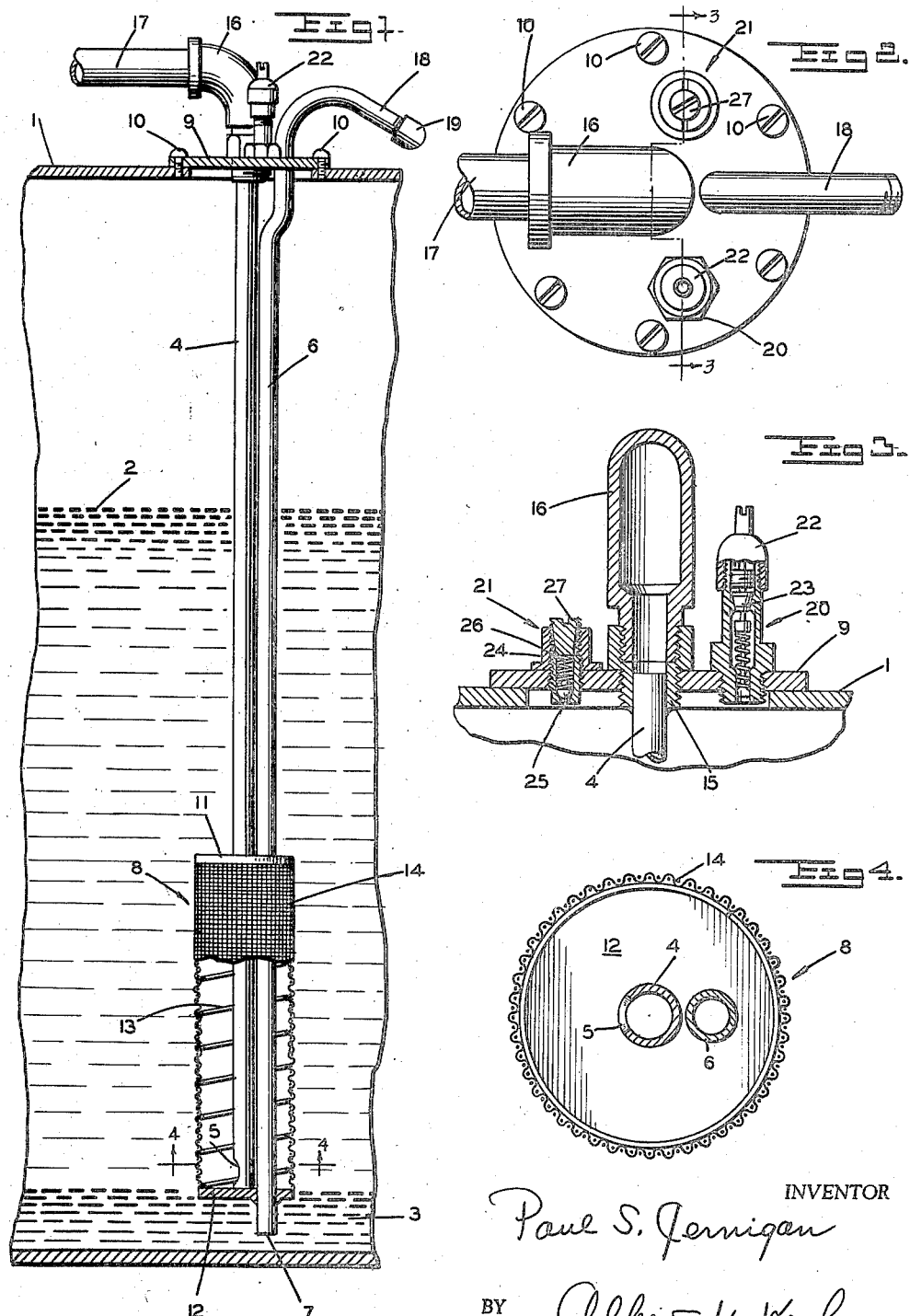
INVENTOR
Paul S. Jernigan
BY Albert H. Kirchner
ATTORNEY Patented Sept. 22, 1953

2,652,926

UNITED STATES PATENT OFFICE 2,652,926

WATER DISCHARGE FITTING FOR FUEL TANKS AND THE LIKE

Paul S. Jernigan, Fort Worth, Tex.

Application September 26, 1949, Serial No. 117,919

1 Claim. (Cl. 210—94)

The principal object of the present invention is to provide means for readily discharging water and other relatively heavy impurities accumulated in the bottom of a fuel or analogous tank.

Motor vehicle gasoline tanks, stationary fuel oil tanks supplying furnaces, fuel oil bunkers supplying marine engines, and a great variety of tanks in which the level of gasoline, fuel oil or the like rises and falls constantly as the liquid is consumed and replenished, gradually build up in their lower portions an accumulation of water and other relatively heavy impurities. This results from water accidentally present in the liquid which is charged into the tank and from condensation of atmospheric moisture in the air that must be admitted to the tank to replace the fuel as the latter is used, and from dirt, dust, scale and the like. Since the water is immiscible with the fuel and of greater specific gravity, it settles in the lowest portion of the tank, which is precisely where the intake of the fuel takeoff line should be located if the tank is to be capable of being substantially completely discharged. This of course presents the problem of keeping the water and sediment from entering the fuel line and makes it desirable to discharge these impurities frequently as they accumulate.

Various means have been proposed for this end. They have generally taken the form of petcocks or removable plugs, and for some large installations suction pumps have been proposed. The present invention aims to provide a water discharge means which will be superior to those of the prior art in efficiency, time and ease of operation, in simplicity of structure, cost of construction and installation, and in general practicability.

A further object is to provide means applicable to a fuel tank for straining fuel educted therefrom and for removing water and like impurities for separate discharge, and for incorporating such means in a single assembly which is adapted readily to be inserted for permanent installation into any already existing tank, regardless of depth or other dimensions.

Another object is to provide means for readily determining the location of leaks in a suction line connecting a fuel tank to the pump which supplies the carburetor or injectors of an internal combustion engine or which sucks fuel from the tank for any other purpose.

Other and further objects and advantages of the invention will be apparent as the description proceeds.

A preferred embodiment of the invention is shown in the accompanying drawing in which Figure 1 is a vertical section through a fuel tank showing the device proposed by the invention;

Fig. 2 is a top plan view of the cap which carries the device and mounts it in place in the fuel tank;

Fig. 3 is a sectional view taken on the line 3—3 of Fig. 2; and

Fig. 4 is a sectional view taken on the line 4—4 of Fig. 1.

Generally speaking, the invention contemplates applying air under pressure to the liquid in the tank and arranging a water discharge tube with its inlet end in the lowest part of the tank and with its discharge end outside the tank well above the highest level possible for the liquid in the tank. Water is thus removed from the bottom of the tank whenever the tank liquid is subjected to air pressure.

In the accompanying drawing the reference numeral 1 designates a tank adapted to contain a supply 2 of gasoline, fuel oil or the like and to accumulate a quantity 3 of water and other heavy impurities in its lowest portion which may be and preferably is depressed to form a kind of sump.

Discharge of the fuel is effected through a fuel eduction tube 4 which may lead to a fuel pump for supplying a carburetor and which has an inlet opening 5 located at or very near the extreme lower end of the tube and hence in the bottom of the tank. This extremely low position of the inlet opening is desirable to permit a maximum of the tank contents to be discharged, it being obvious that all liquid below the level of the tube opening is incapable of being pulled through the tube. However, the lower the tube opening the more likely water is to enter it, and the more necessary it is that the water be removed at frequent intervals before it collects in sufficient quantity to rise to the level of the tube opening.

According to the present invention, a water discharge tube 6 is arranged to have an inlet opening in its lower end 7 in the extreme bottom of the tank, appreciably below the level of the fuel inlet 5, so that the water level can be kept far enough below the fuel inlet to obviate all danger of water entering the fuel line. As shown in Fig. 1, the water has accumulated close up to the level of the fuel inlet. It should be discharged before more accumulates. It will be evident that when the water is educted through the tube 6 sufficiently to lower the water to the level of the end opening 7 of the tube 6, the separation of the water from the fuel inlet 5 will be adequate to insure against water entering the fuel line. This eduction of water as often as may be required is very easily accomplished in use of the device, as will be evident as the remainder of the structure is explained.

The desired relationship of levels of openings 5 and 7 is best made and maintained by securing the tubes 4 and 6 permanently together, as by soldering them to each other and enclosing the lower portions of both of them in a strainer cage 8 and by fixing their upper ends in a closure plate 9 secured by cap screws 10 to the margins of an opening in the top of the tank down through which the tubes extend.

The strainer cage is of simple construction, comprising a top end plate 11 having openings in which both tubes are soldered, a bottom end plate 12 to the upper surface of which the bottom of the fuel tube 4 is secured as by soldering and having a single opening through which the lower end of the water tube 6 projects, and a relatively heavy wire 13 arranged spirally between the end plates and providing support for a cylinder 14 of fine mesh screen.

The fuel tube 4 extends through the closure plate 9 and may be secured thereto in any convenient manner. However, it is desirable to make the tube in separable portions, disconnectible at the plate, for convenience in installing the device. A simple form of such connection is shown in Fig. 3, comprising a nipple 15 threaded into the plate and having the tube 4 press fitted into its lower end and having an elbow 16 threaded into its upper end. The main fuel line 17 is threaded into the elbow by means of a union or otherwise, or the connection may be made in any suitable well known way.

The water tube 6 extends through the closure plate 9 and terminates in a down bent outer end 18 provided with a threaded terminal cap 19.

Also mounted in the closure plate 9 are an air inlet nipple 20 and a blow-off relief valve 21. The nipple 20 may be identical with those that are commonly used on automobile tire inner tubes, including the threaded outer end normally holding a cap 22 which is removable for application of a pump or air pressure hose line. The customary valve stem 23 is preferably located in the nipple 20. The valve 21 is any simple kind of check valve for relieving excessive air pressure in the tank 1. As shown in Fig. 3 this valve may take the form of a short tube 24 containing a ball 25 urged inwardly against its seat by a spring 26 which is adjustably loaded by a screw plug 27. It will be evident that pressure of air in the tank exceeding the setting for which the plug 27 is adjusted will cause the ball to unseat and pass air out between the plug and the valve tube. The plug may be kerfed along its sides to facilitate passing the air.

The purpose of the relief valve 21 is to protect the tank, fuel line and fuel pump, etc., from damage by any excess pressure that may be developed in the tank. To assist in this object, the fuel line may include a shut-off valve (not shown) which can be closed prior to applying air pressure to the nipple 20 and opened after the cleaning operation is completed and the air pressure in the tank is reduced to atmospheric.

To make the assembly carried by the closure plate 9 adaptable to all of a wide range of tanks, regardless of their depth, it is desirable to provide the tubes 4 and 6 in excess length before they are mounted in the plate and have them soldered together in their lower portions only. The upper end portion of the water tube 6 can then be sprung out from contact with the fuel tube 4, both tubes can then be passed upwardly through the proper holes in the plate until the lengths of tube remaining below the plate are appropriate to position the hole 7 close to the bottom of the tank, and the excess lengths of both tubes above the plate can be trimmed off and the tubes soldered or otherwise secured in the plate or in the plate and nipple 15 respectively.

The device is used as follows:

Whenever the level of water 3 in the tank bottom is believed to be approaching too closely to the fuel inlet opening 5, the cap 19 is removed from the discharge end 18 of the water tube 6, the cap 22 is removed from the nipple 20, and an air hose is applied to the nipple. In this way air pressure is built up in the tank and liquid is raised in the tube 6, discharging from the uncapped end portion 18. Discharge is continued as long as water issues from the tube; as soon as fuel appears the cap 19 should be reapplied and the input of air stopped. The operator knows, by the fact that fuel is being discharged, that the water level in the tank has been lowered a safe distance below the fuel inlet opening 5, so that the tank may continue in operation until further accumulation of water makes another water discharging operation necessary.

If the air inlet nipple 20 contain a valve stem 23, as is preferred, the air pressure may be applied by means of any customary kind of valveless hand pump such as are used in inflating bicycle and automobile tires. Of course such a valve stem is not necessary when the pressure is applied by means of the heavy pressure air lines regularly found at motor vehicle filling stations. It is to protect the tank and fuel system from damage by such heavy pressure lines that the relief valve 21 is used. This valve is set to blow off at some low pressure that the tank, tubes and connections can stand without danger. As has been explained, elements in the fuel line beyond the tank can be protected additionally if desired by including a shut-off valve in the line and closing it during the application of air pressure to the tank.

As has been stated in the introductory part of this specification, one of the objects of the invention is to provide means for readily determining the location of leaks in the fuel line 17 in cases where the fuel passes through the line by the suction action of a pump such as is commonly used in installations in which the tank is located below the level of the point where the fuel is consumed. Such leaks of course involve the admission of air into the line, and not the loss of liquid therefrom, and consequently they are ordinarily extremely difficult to locate. They can easily be located by means of the present device by simply applying air pressure to the tank 1 in the manner which has been described without, however, closing the valve (not shown) in the fuel line and with the tube 18 closed by the cap 19. This has the effect of putting fuel in the line under pressure, thus forcing liquid from the line at the point of the leak therein. Such leaking liquid is readily observable and indicates the location of the leak. Of course this application of pressure should be made after preliminarily discharging water from the tank in the manner which has been described.

It is believed that the construction, operation and advantages of the invention will be clear from the foregoing explanation of the presently preferred embodiment. It is to be understood that departures from this specific form of the constructiton may be made within the spirit of the invention as defined by the appended claim and that it is not necessary that all the elements of the inventive combination be used conjointly, except as recited by the claim.

I claim:

A combination fuel takeoff and water discharge fitting for a motor vehicle tank containing liquid fuel that is immiscible with water comprising a cap attachable to an opening in the upper portion of the tank, a pair of tubes secured in the cap and having portions extending into the tank and secured together, one of said tubes being connectible to a fuel takeoff line and having an inlet opening in the lower portion of the tank, and the other tube being a water eduction tube having an outlet outside the tank and an inlet opening in the lower portion of the tank below the level of the inlet opening of the first named tube, a generally cylindrical strainer device having a diameter small enough to be insertible through the tank opening surrounding the lower portions of the two tubes and secured to both of them, enclosing the inlet opening of the first named tube and having an imperforate bottom provided with an opening through which the portion of the water eduction tube having the inlet opening therein projects, and an air inlet fitting mounted in said cap for conducting air to the tank for subjecting the tank contents to pressure sufficient to discharge water through said water eduction tube.

PAUL S. JERNIGAN.

References Cited in the file of this patent

UNITED STATES PATENTS

| Number | Name | Date |
| --- | --- | --- |
| 1,499,589 | Navin | July 1, 1924 |
| 1,846,718 | Greeson et al. | Feb. 23, 1932 |
| 2,175,563 | Green et al. | Oct. 10, 1934 |
| 2,002,407 | Lemke | May 21, 1935 |
| 2,378,737 | Simkovits | June 19, 1945 |
| 2,464,496 | Gee | Mar. 15, 1949 |
| 2,489,682 | Smith et al. | Nov. 29, 1949 |